United States Patent Office 3,013,908
Patented Dec. 19, 1961

3,013,908
B - STAGE DICYANDIAMIDE - FORMALDEHYDE CONDENSATION PRODUCT, PROCESS OF PREPARING THE SAME, AND PROCESS OF PLUMPING TANNED LEATHER
Wolfhard Luck, Koln-Stammheim, Bruno Zorn, Koln-Deutz, and Gustav Mauthe, Opladen, Germany, assignors to Farbenfabriken Bayer Aktiengesellschaft, a corporation of Germany
No Drawing. Filed Nov. 22, 1957, Ser. No. 698,049
Claims priority, application Germany Dec. 8, 1956
12 Claims. (Cl. 117—142)

This invention relates to condensation products of dicyandiamide with formaldehyde in contact with water-soluble salts of metals with both sulfurous acid and sulfonic acid and to the plumping of leather with the condensation products.

A simplified flow diagram of the process is as follows:

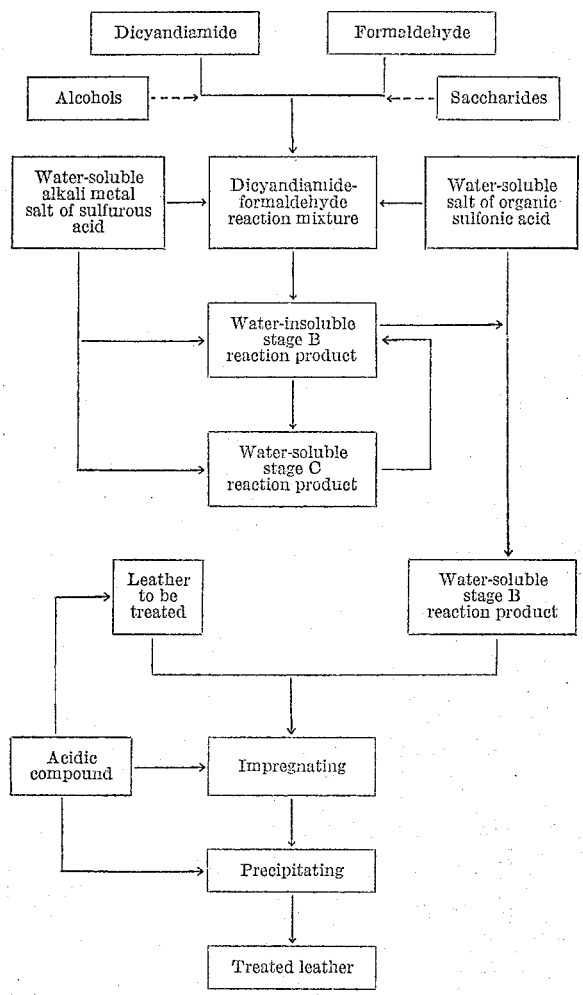

The invention provides means for facilitating discontinuance of the condensation of the dicyandiamide with the formaldehyde at the intermediate water-insoluble stage of the condensation, for decreasing the proportion of the sulfonate salt required, and for improving the effect of the sulfonate in stabilizing water solutions of the final condensation product, all of these improvements being obtained through the joint use of the sulfite and sulfonate.

It is known to convert alkaline condensation products from dicyandiamide and formaldehyde into water-soluble products precipitable by acids by adding water-soluble salts of organic sulphonic acids before, during or after the condensation of dicyandiamide with formaldehyde. The requisite amount of water-soluble salts of organic sulphonic acids is the larger, the smaller the quantity of formaldehyde used per mol of dicyandiamide and the further the condensation between dicyandiamide and formaldehyde has proceeded. It is, therefore, advantageous to use more than 3.5 mols of formaldehyde per mol of dicyandiamide for the manufacture of the condensation products of dicyandiamide and formaldehyde. The condensation products thus formed are known to be first water-soluble (stage A), then water-insoluble (stage B) and, upon prolonged condensation, again water-soluble (stage C). As water-insoluble condensation products there are, therefore, to be understood here and in the following, condensation products which do not dissolve clearly when diluted with much water at room temperature. During the condensation itself the condensation products remain dissolved at all times. The conversion of those condensation products from dicyandiamide with more than 3.5 mols of formaldehyde per mol of dicyandiamide, which are in the stage A or B as described above, into water-soluble products precipitable with acid is possible with relatively small amounts of water-soluble salts of organic sulphonic acids. The condensation products of stage C require appreciably more water-soluble salts of organic sulphonic acids. With these condensation products, small additions lead to precipitation.

It is often desirable to allow the condensation of dicyandiamide to proceed with more than 3.5 mols of formaldehyde per mol of dicyandiamide to stage B only, in order to obtain water-soluble products precipitable with acid with as little water-soluble salts of organic sulphonic acids as possible. However, stages A and B are passed comparatively rapidly and careful control of the course of the reaction is necessary to interrupt the condensation at stage B which is often difficult to carry out, particularly in the manufacture of these products on an industrial scale.

The water-soluble acid-precipitable condensation products from dicyandiamide, formaldehyde and water-soluble salts of organic sulphonic acids thus obtainable have the disadvantage that their solutions are not stable but become cloudy after a short time and water-insoluble constituents are precipitated. The stability of these solutions cannot be improved by the addition of a larger amount of water-soluble salts of organic sulphonic acids than would be required for the production of water-soluble acid-precipitable products. These condensation products must, therefore, be dried after manufacture, in order to obtain a storable product, and the solutions of the dried products have likewise only a limited keeping quality.

It has now been found that condensation products obtainable by condensation of dicyandiamide with formaldehyde at a pH value of more than 7 in the presence of water-soluble salts of sulphurous acid form a more stable stage B and are convertible into water-soluble acid-precipitable products by smaller amounts of water-soluble salts of organic sulphonic acids than similar condensation products obtainable without the use of water-soluble salts of sulphurous acid. The water-soluble salts of sulphurous acid are to be used in a quantity of 0.01–0.5 mol per mol of dicyandiamide and the water-soluble salts of organic sulphonic acids at least in such a quantity that, during the condensation, a sample of the reaction solution is soluble in water at any time, if need be with heating, and precipitable by acids. These condensation products obtainable according to the invention form substantially more stable aqueous solutions than the known products obtainable without the use of water-soluble salts of sulphurous acid. In this way, it is also possible for the first time to use as water-soluble salts of organic sulphonic acids those of condensation products from sulphonated or sulphomethylated phenols or naphthols, or of sulphonated or sulphomethylated condensation products from phenols or naphthols for the manufacture of practically useful water-soluble products precipitable with acid.

It was not to be expected that by the use of water-soluble salts of sulphurous acid in the manufacture of condensation products from dicyandiamide and formaldehyde the formation of products which are not water-soluble (stage B) would be favored, particularly since it is known that in the production of carbamide condensation products water-soluble condensation products are more readily obtainable with the addition of water-soluble salts of sulphurous acid than without the use of water-soluble salts of sulphurous acid.

It was also not to be expected that by the use of small amounts of water-soluble salts of sulphurous acid in the condensation of dicyandiamide with formaldehyde the stability of aqueous solutions of the products obtainable by condensation of dicyandiamide with formaldehyde with the addition of water-soluble salts of organic sulphonic acids would be improved to such an extent, since the production of such products by known methods requires relatively large amounts of water-soluble salts of organic sulphonic acids.

It has moreover been found that by the additional use of water-soluble mono- and/or polyhydric alcohols and/or mono and/or polysaccharides in the condensation of dicyandiamide, formaldehyde and water-soluble salts of sulphurous acid the formation of condensation products of stage B described above is still favored and that water-soluble acid-precipitable products are obtainable with even smaller amounts of water-soluble salts of organic sulphonic acids than is the case with the corresponding products obtainable without the use of the aforesaid compounds in the condensation of dicyandiamide, formaldehyde and water-soluble salts of sulphurous acid.

The process of preparing these condensation products is outlined in the flow sheet shown above. The flow sheet in addition shows the use of these condensation products in the treatment of leather, as described hereinafter. As shown in the flow sheet, dicyandiamide and formaldehyde are combined to form a reaction mixture in which they are present in an aqueous solution at a pH of more than 7. The reaction mixture may in addition include an alcohol and/or a saccharide as optional ingredients. This reaction mixture is reacted to a water-insoluble B-stage, which is converted to a stable water-insoluble stage B reaction product by the alkali metal salt of sulfurous acid. This salt may be present in the original reaction mixture, or may be reacted with the stage B reaction product. The reaction mixture may also be carried forward to the water-soluble C-stage, in which event it is brought back to the water-insoluble B-stage by reaction with the sulfurous acid salt. The water-insoluble B-stage product is converted to a water-soluble acid-precipitable product by reaction with a water-soluble salt of an organic sulfonic acid, which also may be present in the original reaction mixture or which may be reacted with the water-insoluble B-stage reaction product.

The acid-precipitable organic sulfonic acid reaction product is used in the treatment of leather. The treated leather is acidified in order to effect precipitation of the reaction product of the invention, and the acidified compound used to effect this precipitation can be present in the leather initially or can be added after the impregnation.

The products obtainable according to the invention distinguish themselves from known water-soluble acid-precipitable condensation products from dicyandiamide, formaldehyde and water-soluble salts of sulphurous acid by an additional content of water-soluble salts of organic sulphonic acids. The manufacture of the products according to the invention is effected under conditions which, if applied to a condensation of dicyandiamide, formaldehyde and a water-soluble salt of sulphurous acid alone, would lead to insoluble products.

It is important to note that upon precipitation of the condensation products obtainable according to the invention by acidification of their solutions, not only the dicyandiamide-resin portions precipitate, but also the water-soluble salts of the organic sulphonic acids, including particularly those which are not even precipitated by acidification of their solutions; this additional precipitation of the water-soluble salts of organic sulphonic acids used in the manufacture of the products of the invention, particularly of the condensation products of organic sulphonic acids present in the form of their salts, is a particular advantage of the products obtainable according to the invention. It is thus possible to precipitate, for example, water-soluble salts of naphthalene-sulphonic acid condensation products, neutral waste sulphite liquors or sulphonated phenol-formaldehyde condensation products, in one operation, in an insoluble form, on any material. Normally two steps have been necessary for this purpose. The anionic auxiliaries, tanning agents or dyestuffs were applied for example to the material to be treated in one step and these were fixed by cationic agents in a second step.

Suitable salts of organic sulphonic acids are, for example, salts, particularly alkali metal salts, of known condensation products of aromatic compounds containing sulphonic acid groups, for example formaldehyde condensation products of naphthalene, phenol or naphthol sulfonic acids or of corresponding sulphomethylated compounds.

Sulphonated or sulphoalkylated condensation products of aromatic compounds, for example of phenols, naphthols, naphthalene or xylene are also applicable. The condensation products containing sulphonic acid groups may contain condensed waste sulphite liquor or aliphatic compounds reacting, for example, with formaldehyde such as urea or melamine. As water-soluble salts of organic sulphonic acids there may further be used salts of aromatic sulphonic acids, for example beta-naphthalene-sulphonic acid or sulphonated p,p'-dihydroxy-diphenyl-sulphone or waste sulphite liquor.

The aforesaid salts of aromatic sulphonic acids may be completely or partially replaced by salts of aliphatic sulphonic acids or sulphuric acid esters containing at least a hydrocarbon chain of 10 carbon atoms, for example sulphonated castor oil or octadecyl-sulphonate, or by dyestuffs containing sulphonic acid groups.

As water-soluble salts of sulphurous acid there may be used the alkali metal salts (for example sodium or potassium salt) of sulphurous acid. It is also possible to use the ammonium salts or the corresponding acid salts of sulphurous acid or its anhydride, when care is taken that in carrying out the condensation of dicyandiamide and formaldehyde the reaction solution contains a sufficient amount of alkali so that its pH value is always more than 7.

Formaldehyde may be employed in the form of a commercial solution, for example, a 30 to 38% solution, but also in the form of paraformaldehyde or trihydroxy-methylene with the addition of water. Instead of formaldehyde it is also possible to use compounds splitting off formaldehyde such as formaldehyde-bisulphite or hexamethylenetetramine.

As water-soluble mono- or polyhydric alcohols for additional use in the condensation there may be employed, for example, methyl, ethyl or isopropyl alcohol, glycerol, glycol, and sorbitol. Additional hydroxy compounds that may be used are the mono- or poly-saccharides as for example glucose, starch or molasses, all of which are soluble (dispersible) at least in hot water.

The condensation of dicyandiamide, formaldehyde and a water-soluble salt of sulphurous acid takes place at a pH value of the reaction solution of more than 7, expediently with heating and under reflux. To obtain the requisite pH value of more than 7, there is added to the reaction mixture before the condensation so much sodium hydroxide solution, borax or another compound giving an alkaline reaction in aqueous solution, until a pH value of more than 7, preferably 7.5 to 8.5 is obtained. The proportion of formaldehyde and dicyandiamide may vary within wide limits as from 0.5 mol up. It is, however, advantageous to use 3.5 to 5 mols of formaldehyde per mol of dicyandiamide. The proportion of water-soluble salts of sulphurous acid to dicyandiamide should amount to 0.01 to 0.5, preferably 0.05 to 0.35 mol per mol of dicyandiamide.

In the condensation between dicyandiamide, formaldehyde and water-soluble salts of sulphurous acid, water-soluble reaction products are first formed (stage A) which by further condensation are rapidly converted into the insoluble products, i.e. products which may not be diluted with water (stage B). The condensation is terminated at any desired time in stage B. The condensation between dicyandiamide, formaldehyde and a water-soluble salt of sulphurous acid may, however, also be carried out in such a manner that dicyandiamide and formaldehyde are condensed first by themselves at a pH value of more than 7, a water-soluble salt of sulphurous acid being subsequently added thereto. If the condensation of dicyandiamide, formaldehyde and a water-soluble salt of sulphurous acid is effected in the presence of mono- or polyhydric alcohols and/or mono- or polysaccharides, these agents are advantageously added at the beginning of the condensation between dicyandiamide, formaldehyde and a water-soluble salt of sulphurous acid. The addition of the water-soluble salts of organic sulphonic acids may be effected, if desired with heating, after or at any desired time during or before the condensation between dicyandiamide, formaldehyde and a water-soluble salt of sulphurous acid. If the water-soluble salts of organic sulphonic acids are added before or during the condensation, the conditions of condensation have to be chosen such that under these conditions dicyandiamide, formaldehyde and a water-soluble salt of sulphurous acid, when condensed alone, form condensation products which are not clearly soluble in water (stage B).

The addition of water-soluble salts of organic sulphonic acids should not cause a falling of the pH value of the reaction solution below 7, especially no acidic salts should be taken. In no case must carbon dioxide be allowed to evolve during or after the addition of the water-soluble salts of organic sulphonic acids. When using water-soluble salts of phenolic condensation products containing sulphonic acid groups, it is advantageous to add them along with such an amount of alkalis that the mixture exhibits a pH value of more than 9. The amount of water-soluble salts of organic sulphonic acids required to obtain water-soluble acid-precipitable products is the greater, the more prolonged the condensation time of dicyandiamide with formaldehyde and a water-soluble salt of sulphurous acid, and the smaller the amount of water-soluble salts of sulphurous acid and of formaldehyde are chosen. The requisite amount is, moreover, not the same for water-soluble salts of different organic sulphonic acids.

The expedient amount of water-soluble salt of organic sulphonic acid to be used which may be larger than the requisite amount depends on the purpose for which the products obtainable according to the invention are to be employed. The requisite amount of these salts of organic sulphonic acids is ascertained in known manner, for example by titration of a definite quantity of the condensation products of dicyandiamide and formaldehyde with the alkali metal salt of sulphonic acid, until the mixture is clearly soluble when diluted with water and the product precipitates on acidification.

The precipitation of the condensation products obtainable according to the invention may be carried out at various pH values below 7, dependent on the amount of water-soluble salts of sulphurous acid and of the type and quantity of water-soluble salts of organic sulphonic acids used, and is not reversible. The precipitation may not only be effected with various acids, but also with salts giving an acid reaction in an aqueous solution, for example aluminum sulphate, chromium sulphate or zirconium sulphate.

The following examples are given for the purpose of illustrating the invention. In these examples and elsewhere herein proportions are expressed by weight unless specifically stated to the contrary.

EXAMPLE 1

84 grams of dicyandiamide
28.5 grams of sodium metabisulphite
325 grams of 37% formaldehyde and a quantity of borax, in such amount that the reaction solution shows a pH value of 7.5–8.5, are heated under reflux for 2 hours. The clear reaction product is not clearly soluble in water (stage B). 44 grams of sodium dinaphthyl methane disulphonate are added to the hot solution and heating with stirring is continued until the whole is dissolved. The product is water-soluble and may be precipitated with 1 N-acetic or 1 N-sulphuric acid. The indicated amount of the sulphonate required for the production of water-soluble, acid-precipitable products is less dependent on the condensation time, but the requisite amount of the sulphonate for a similar product prepared, however, without the addition of sulphite, is highly dependent on the condensation time and amounts to 2–2.5 times and, as soon as the condensation product has reached the stage C, even to 3–4 times the quantity indicated at the beginning of this example.

The product prepared in the presence of sodium metabisulphite, for instance, is still soluble in water after a storage of about 3 months, whereas a product prepared without the sulphite but with as much as 2.5 times (110 grams) of the above-mentioned quantity of the sodium sulfonate salt looses its solubility after a few days and resinous ingredients soon separate.

EXAMPLE 2

84 grams of dicyandiamide
28.5 grams of sodium metabisulphite
325 grams of 37% formaldehyde, and
135 grams of a delimed waste sulphite liquor are mixed together concentrated to a solid content of 50–55% and, if desired, borax added until the pH value of the reaction mixture is 7.5–8.5. The mixture is heated under reflux for 4 hours. The reaction product is water-soluble and precipitates on the addition of acid.

EXAMPLE 3

259.2 parts of cresol U.S.P., 150.4 parts of phenol and 10 parts of caustic soda, dissolved in 15 parts of water, are heated for 1 hour at 65° C. and then for 5 hours at 70° C. after addition of 400 parts of 30% formaldehyde and while stirring. The oily reaction product is added slowly to a solution of 95 parts of sodium metabisulfite, 230 parts of water and 58 parts of acetone, which has been prepared while cooling. Then the mixture is heated for 6 to 8 hours at 95°–96° C. while stirring, until the product is clearly soluble in water.

To 150 parts of this reaction product there are added while stirring 17.5 parts of 40% soda lye. After this there are added slowly at a temperature of 40°–50° C., 200 parts of a condensation product of dicyandiamide, which is not clearly soluble in water and has been prepared as described below. The end product is water-soluble and precipitable by acid.

The above-mentioned condensation product of dicyandiamide is obtained as follows: 272 parts of dicyandiamide in 1095 parts of 37% formaldehyde are dissolved with heating, and the solution is heated to boil under reflux, until the reaction product is clearly water-soluble again (C stage) after passing through a B stage, in which it is not water-soluble. The reaction product becomes water-soluble this way after a condensation period of 4 to 5 hours. Then there are added 85.5 parts of sodium metabisulfite and this mixture is heated under reflux and condensed for 3 further hours. After a short condensation period, the reaction product is no longer clearly water-soluble.

Using, instead of the aforementioned condensation product, a product prepared under the same conditions but without secondary condensation using a salt of sulphurous acid, then there is obtained a product, which together with either the amount of the above-mentioned phenolic condensation product or twice its amount is not water-soluble and precipitable with acid.

EXAMPLE 4

200 parts of a sulphonated phenolic condensation product, which has been prepared as described in Example 1 of German Patent No. 693,923, and 40 parts of soda lye (40%) are made alkaline while being stirred. Then, while stirring is in progress, there are added to the syrup, which has a temperature of about 40° to 50° C., 200 parts of a condensation product of dicyandiamide and formaldehyde, which has been prepared as described below. The end product is water-soluble and precipitable from this solution with addition of acid.

For the preparation of the above-mentioned condensation product of dicyandiamide and formaldehyde there are heated to boiling and while stirring, 168 parts of dicyandiamide, 76 parts of sodium metabisulfite and 650 parts of 37% formaldehyde, and this mixture is further boiled for 2 hours under reflux. After a short heating period, the reaction shows a pH value of about 8 to 8.5. The clear reaction product goes dull when diluted with water, showing it is water-insoluble.

EXAMPLE 5

18 parts by weight of sodium lauryl sulphate are added to 200 parts by weight of the dicyandiamide-formaldehyde condensation product obtainable according to Example 4. The mixture is heated with stirring until the whole is dissolved. The product is water-soluble and precipitable upon addition of acid.

EXAMPLE 6

84 parts of dicyandiamide, 30 parts of paraformaldehyde, 30 parts of the sodium salt of dinaphthyl methane disulphonic acid, 20 parts of a 40% solution of sodium bisulfite and 12 parts of water are warmed together, and the mixture is heated to boil under reflux. The condensation is completed when a sample diluted with 10 parts of water shows precipitation upon addition of 1 N sulphuric acid. This takes place after a condensation period of about 30 to 45 minutes.

EXAMPLE 7

84 parts dicyandiamide, 4 parts of borax and 23.7 parts of sodium meta-bisulfite are dissolved in 400 parts of 30% formaldehyde and 80 parts of methanol, and this solution is heated to boil under reflux. After a short period, a sample of the reaction product is no longer dilutable with water.

In short intervals a sample is taken off the reaction mixture, and after cooling down quickly, 20 cc. of this sample are titrated with a 20% solution of the sodium salt of dinaphthyl methane disulphonic acid, until the mixture obtained is clearly water-soluble at room temperature. The condensation is completed as soon as 5 cc. of the said sodium solution are used for the preparation of a clearly water-soluble product. It takes place after a condensation period of about 1 to 1.5 hours.

To 200 parts of this reaction mixture are added, while stirring, 14 g. of the sodium salt of dinaphthyl methane disulphonic acid. The product is clearly water-soluble and precipitable in acid.

A similar prepared product, but without addition of methanol, needs about twice the amount of the above-mentioned sodium salt for the preparation of a clearly water-soluble and acid-precipitable product, according to the process of titration described above.

EXAMPLE 8

84 parts of dicyandiamide are dissolved in a solution of 21 parts of a 40% solution of sodium bisulphite, 325 parts of 37% formaldehyde, 184 parts of glycerin and 600 parts of a sulphite waste liquor, which has been delimed and thickened to a strength of 50% to 55%. This mixture is heated to boil under reflux, until a sample of the reaction product shows precipitation with 1 N $H_2SO_4$, after it has been cooled down and diluted with the same amount of water. Precipitation takes place after a condensation period of about 7 hours.

EXAMPLE 9

84 parts of dicyandiamide, 15 parts of paraformaldehyde and 20 parts of the sodium salt of dinaphthyl methane disulphonic acid are heated while stirring together with a solution consisting of 13 parts of 40% sodium bisulfite, 4.8 parts of water and 67 parts of 1,2,6-hexanetriol, and this mixture is heated to boiling for a further hour under reflux. The poduct is water-soluble and precipitable with acid, for instance acetic acid.

EXAMPLE 10

84 parts of dicyandiamide, 2 parts of borax, 24 parts of sodium metabisulfite, 80 parts of glucose and 77 parts of the sodium salt of dinaphthyl methane disulfonic acid are dissolved while stirring in 400 parts of 30% formaldehyde and this solution is heated to boiling under reflux. The reaction is completed as soon as a sample of the reaction product shows precipitation with 1 N-acetic acid, after it has been diluted with 5 times the amount of water. Precipitation takes place after condensation for about 1.5 to 2 hours. Using instead of glucose, the same amount of water-soluble starch there is obtained a similar condensation product.

EXAMPLE 11

The procedure and composition of Example 1 are followed, except that the metabisulfite there used is replaced by an equivalent amount of sodium or potassium sulfite, $Na_2SO_3$ or $K_2SO_3$. Reaction time and pH value (7.5–8) have to be adjusted to reproduce results obtained in Example 1.

Also the sodium dinaphthyl methane disulphonate of Example 1 is replaced by an equal weight of any other sulfonate disclosed herein, the sulfonate being used in conjunction with the metabisulfite.

Treatment of leather

The following sections relate to use of products made as described above in the industry of leather.

The condensation products of dicyandiamide with formaldehyde in contact with the sulfite and sulfonate are particularly useful in plumping or filling tanned leather, particularly leather that has been tanned already with mineral tanning agents. Examples of such leather that is treated to advantage with the new condensation products in aqueous solution are chrome tanned leather.

The above products are used as fillers in leather in the amount of 1–10% of the weight of the leather to be treated. Aqueous solutions of the fillers are used to advantage, but they may also be fulled in the solid state into the moist leather. They may be applied together with anionic or nonionic fat-liquoring agents and/or anionic dyestuffs. If desired, inert insoluble fillers such as titanium dioxide or finely divided polyvinyl chloride can additionally be used.

The fillers are preferably fulled into moist acid leathers having a pH value of up to about 7. Depending on the acdi content of the leather, there may be added during or after the incorporation of the fillers acording to the invention, acids or compounds whose aqueous solution has an acid reaction, as, for example, formic, sulphuric or boric acid, or aluminum, chromium, or zirkon sulphate, preferably in such an amount that the leathers show a pH value of 3.5–5.5 at the end of the after-treatment. If desired, the fillers may also be incorporated with the leather having a pH value of more than 7. In this case, acids or compounds whose aqueous solution has an acid reaction are to be added in such an amount that the leather has a pH value of below 6, preferably of 3.5–5.5 at the end of the treatment.

The fillers applicable according to the invention may be employed for the plumping of leather tanned with one or more of known tanning agents, for example vegetable, synthetic mineral or resinous tanning agents.

The leather after-treated with these fillers distinguish themselves by good plumpness, particularly of the loose parts of the hide, and greater grain resistance of the leather. The fineness of the grain appearance of the leather is thereby only slightly changed.

The following examples are given for the purpose of illustrating the invention.

EXAMPLE 12

100 kg. of shaved neutralized calf leather chrometanned by conventional methods and showing in the cut a pH value of 4.3–4.5 are drummed with 10 kg. of the filler described below and 100 kg. of water for 30 minutes and, after the addition of 0.5 kg. of boric acid, for a further 10 minutes. Working is then continued as usual. A plump leather having a resistant and smooth grain is thus obtained.

The product (filler) used for plumping is obtainable for example as follows:

8.4 kg. of dicyandiamide, 2.85 kg. of sodium metabisulphite, 32.5 kg. of 37% formaldehyde and 0.02 kg. of borax are heated under reflux for 2 hours, and to the hot mixture 44 kg. of sodium dinaphthyl methane disulphonate are added with stirring. Heating is continued until the salt has completely dissolved, and the product is then allowed to cool.

EXAMPLE 13

100 kg. of shaved and neutralized calf leather chrometanned by conventional methods and showing in the cut a pH value of 4.3 to 4.5 is drummed with 100 to 150 kg. of water and 10–15 kg. of the filler product described below, which shows a concentration of 40%. At the end of the treatment the liquor shows a pH value of 4.8–5.0 eventually on adding acetic acid or boric acid. The drumming period varies with the quantity of leather and the intensity of the drumming process. After ½ hour to 2 hours, the product is taken off the leather. This is perceptible from the fact that after addition of a diluted acid solution, for instance 1 N $H_2SO_4$, to the liquor, no further precipitation is to be seen. Then working is continued as usual. A plump leather having a resistant and smooth grain is thus obtained.

The filler product used for plumping is obtained by condensing, for 4 hours at boiling temperature and under reflux, the mixture of 8.4 parts of dicyandiamide, 2.37 parts of sodium metabisulfite, 45 parts of 30% formaldehyde, 9.2 parts of ethanol, and 7.5 parts of the sodium salt of dinaphthyl methane disulphonic acid.

EXAMPLE 14

The procedure and composition described in Example 13 are followed except that the filler product is obtained by condensing for 4 hours at boiling temperature and under reflux, the mixture of 8.4 parts of dicyandiamide, 2.37 parts of sodium metabisulfite, 36.5 parts of 37% formaldehyde, 4 parts of technically clear glucose, and 7.5 parts of the sodium salt of dinaphthyl methane disulphonic acid. The product of a concentration of 60% is used for the tanning of calf leather in an amount of 6–10% referred to wet leather.

EXAMPLE 15

Calf leather is processed as described in Example 13 but with a filler product obtained as described below:

8.4 parts of dicyandiamide, 3 parts of paraformaldehyde, 3 parts of the sodium salt of dinaphthyl methane disulphonic acid, 2 parts of a 40% solution of sodium bisulphite and 1.2 parts of water are heated to boil under reflux. The condensation is completed as soon as a sample of the reaction product, when diluted with 10 parts of water at room temperature, shows precipitation with N $H_2SO_4$, which occurs after a condensation period of 30 to 45 minutes.

There is obtained a plump leather with a smooth grain.

EXAMPLE 16

Shaved calf leather which has been chrome-tanned by conventional methods is neutralized until its cut is colored blue with the indicator bromocresol green. Then the procedure and composition of Example 13 are followed but using filler product of 50% concentration which has been obtained as described below. A plump leather having a resistant and smooth grain is thus obtained.

The filler product used for the after-treatment is obtained by careful addition of 200 parts of a sulphonated phenolic condensation product, which has been prepared as described in Example 1 of German Patent No. 693,923, to 40 parts of a 40% soda lye. To the resulting syrup, which has been warmed to about 40°–50° C., there are added, while stirring 200 parts of a dicyandiamide condensation product which has been prepared as described below:

16.8 parts of dicyandiamide, 7.6 parts of sodium metabisulphite and 65.0 parts of a 37% solution of formaldehyde are heated while stirring and then boiled for 2 hours under reflux.

EXAMPLE 17

100 kg. of shaved and neutralized calf leather chrometanned by conventional methods is drummed with 100–150 kg. of water and 8–12 kg. of a 50% filler product, which has been obtained as described below. The filler is taken up quickly. This is to be seen from the fact that the primary thick liquor becomes clear and a sample of the product does not show precipitation by adding 1 N $H_2SO_4$. The drumming period varies with the quantity of leather and the intensity of the drumming process. Then the working is continued as usual and there are obtained well filled leathers.

The filler product is obtained as follows: 16.8 parts of dicyandiamide, 64.8 parts of 37% formaldehyde, and 4.7 parts of sodium metabisulphite are heated and condensed for 3 hours under reflux and at boiling temperature of the mixture. Then there are added 35 parts of a sulphite waste liquor, which has been delimed and thickened to a concentration of 50% and the condensation is continued for a further hour at boiling temperature.

EXAMPLE 18

100 kg. of case leather, which has been tanned with vegetable and synthetic tannins, is drummed for 1–2 hours with 8–12 kg. of the filler described in Example 6 and with 150 kg. of water. After working up as usual there is obtained a leather which is firmer than the untreated leather.

EXAMPLE 19

100 kg. of neutralized calf leather, which has been treated with 4% of $ZrO_2$, in form of a 25% basic sulfate, and which shows a pH value of about 5 is drummed with 150 kg. of water and 10 kg. of a 55% filler product, which has been prepared as described below. The liquor shows a pH value of 5 at least when the treatment is completed, i.e. after the product has been taken off the leather. After this it is dubbed and worked up as usual. There is obtained a lump leather having a resistant and smooth grain.

The filler product used for the after-treatment is obtained as follows: 84 parts of dicyandiamide, 365 parts of 37% formaldehyde, 23.7 parts of sodium metabisulphite, and 75 parts of the sodium salt of dinaphthyl methane disulphonic acid are condensed for 2.5 hours under reflux and at boiling temperature of the mixture.

It is to be understood that it is intended to cover all changes and modifications of the examples of the invention herein chosen for the purpose of illustration which do not constitute departures from the spirit and scope of the invention.

What is claimed is:

1. The process of preparing an acid-precipitable water-soluble B-stage dicyandiamide-formaldehyde condensation product, stabilized in the B-stage, which comprises heating a reaction mixture comprising formaldehyde and dicyandiamide in the proportion of from about 0.5 to about 5 moles of formaldehyde per mole of dicyandiamide in aqueous solution at a pH of more than 7 to form a water-insoluble B-stage reaction product, stabilizing the water-insoluble B-stage reaction product in the B-stage by incorporating therein by chemical reaction from about 0.01 to about 0.5 mole of a water-soluble alkali metal salt of sulfurous acid, and solubilizing the water-insoluble B-stage reaction product by heating the same with a water-soluble alkali metal salt of an organic sulfonic acid.

2. The process in accordance with claim 1 wherein the water-soluble alkali metal salt of sulfurous acid is incorporated in the condensation product of formaldehyde and dicyandiamide by reacting the same in an aqueous solution at a pH above about 7.

3. An acid-precipitable water-soluble B-stage dicyandiamide-formaldehyde condensation product, stabilized in the B-stage, and prepared by the process of claim 1.

4. A process for plumping tanned leather which comprises impregnating moist tanned leather with an aqueous solution of the reaction product of claim 3, and precipitating the condensation product in the leather at a pH below 7.

5. A process in accordance with claim 4 in which the precipitation is effected by an acid compound present in the leather at the time of impregnation.

6. A process in accordance with the claim 4 in which the precipitation is effected by adding an acidic compound to the aqueous solution after impregnation of the leather therewith.

7. A process in accordance with claim 1 in which the reaction mixture includes a water-soluble organic hydroxy compound reactive therewith.

8. An acid-precipitable water-soluble B-stage dicyandiamide-formaldehyde condensation product, stabilized in the B-stage, and prepared by the process of claim 7.

9. A process for plumping tanned leather which comprises impregnating moist tanned leather with an aqueous solution of the reaction product of claim 8, and precipitating the reaction product in the leather at a pH below 7.

10. The process of preparing an acid-precipitable water-soluble B-stage dicyandiamide-formaldehyde condensation product, stabilized in the B-stage, which comprises heating a reaction mixture comprising formaldehyde and dicyandiamide in the proportion of from about 0.5 to about 5 moles of formaldehyde per mole of dicyandiamide in aqueous solution at a pH above 7 in the presence of from about 0.01 to about 0.5 mole of a water-soluble alkali metal salt of sulfurous acid until a water-insoluble stable B-stage condensation product is formed, and solubilizing the water-insoluble B-stage reaction product by heating the same with a water-soluble alkali metal salt of an organic sulfonic acid.

11. A process in accordance with claim 10 in which the water-soluble alkali metal organic sulfonic acid salt is incorporated in the dicyandiamide-formaldehyde reaction mixture.

12. The process of preparing an acid-precipitable water-soluble B-stage dicyandiamide-formaldehyde condensation product stablized in the B-stage from a water-soluble C-stage dicyandiamide-formaldehyde condensation product, which comprises heating formaldehyde and dicyanidamide in the proportion of from about 3.5 to about 5 moles of formaldehyde per mole of dicyandiamide in an aqueous solution and at a pH above about 7 until a water-soluble C-stage condensation product of formaldehyde and dicyandiamide is formed, reacting the C-stage product with from about 0.01 to about 0.5 mole of a water-soluble alkali metal salt of sulfurous acid until a water-insoluble stable B-stage condensation product is formed, and then solubilizing the water-insoluble B-stage product by heating the same with a water-soluble alkali metal salt of an organic sulfonic acid.

References Cited in the file of this patent

UNITED STATES PATENTS

| | | |
|---|---|---|
| 2,423,185 | Gundel et al. | July 1, 1947 |
| 2,536,983 | Owen | Jan. 2, 1951 |
| 2,567,238 | Sellet | Sept. 11, 1951 |
| 2,637,622 | Dawson et al. | May 5, 1953 |
| 2,662,868 | Kaess et al. | Dec. 15, 1953 |
| 2,737,464 | Dawson et al. | Mar. 6, 1956 |
| 2,737,504 | Dawson et al. | Mar. 6, 1956 |
| 2,956,903 | Spencer | Oct. 18, 1960 |

FOREIGN PATENTS

| | | |
|---|---|---|
| 167,016 | Australia | Nov. 12, 1952 |
| 503,460 | Italy | Dec. 6, 1954 |
| 747,183 | Great Britain | Mar. 28, 1956 |